(12) United States Patent
Metz et al.

(10) Patent No.: US 7,348,372 B2
(45) Date of Patent: Mar. 25, 2008

(54) METHOD FOR DISTORTION-FREE PIGMENTATION OF PARTLY-CRYSTALLINE PLASTICS WITH PHTHALOCYANINE PIGMENTS

(75) Inventors: Hans Joachim Metz, Darmstadt (DE); Thomas Hundsdorf, Weiterstadt (DE); Klaus Brychcy, Frankfurt am Main (DE); Andreas Stohr, Freinsheim (DE)

(73) Assignee: Clariant Produkte (Deutschland) GmbH, Silzbach (DE)

( * ) Notice: Subject to any disclaimer, the term of this patent is extended or adjusted under 35 U.S.C. 154(b) by 218 days.

(21) Appl. No.: 10/502,840

(22) PCT Filed: Jan. 31, 2003

(86) PCT No.: PCT/EP03/00960

§ 371 (c)(1), (2), (4) Date: Jul. 25, 2005

(87) PCT Pub. No.: WO03/066742

PCT Pub. Date: Aug. 14, 2003

(65) Prior Publication Data
US 2006/0155014 A1 Jul. 13, 2006

(30) Foreign Application Priority Data
Feb. 2, 2002 (DE) ................ 102 04 275

(51) Int. Cl.
*C08K 5/34* (2006.01)
*C09B 67/00* (2006.01)

(52) U.S. Cl. ................ 524/88; 106/410; 106/493; 540/136

(58) Field of Classification Search ................ 106/410, 106/493; 524/88; 540/136
See application file for complete search history.

(56) References Cited

U.S. PATENT DOCUMENTS

| 4,107,133 | A |   | 8/1978  | Sawai et al. |
| 4,233,206 | A |   | 11/1980 | Katsura et al. |
| 4,880,472 | A | * | 11/1989 | Bugnon et al. ............. 106/493 |
| 4,889,562 | A |   | 12/1989 | Bugnon et al. |
| 5,271,759 | A |   | 12/1993 | Wooden et al. |
| 5,274,010 | A | * | 12/1993 | Bugnon et al. ............. 523/206 |
| 5,401,780 | A |   | 3/1995  | Bugnon et al. |
| 5,472,495 | A |   | 12/1995 | Schroeder |
| 6,180,694 | B1 |  | 1/2001  | Bugnon et al. |
| 6,288,142 | B1 |  | 9/2001  | Bugnon et al. |
| 6,794,504 | B2 |  | 9/2004  | Klopp et al. |

FOREIGN PATENT DOCUMENTS

| DE | 4214868 | 11/1992 |
| DE | 4313090 | 10/1994 |
| EP | 0296107 | 12/1988 |
| EP | 0466646 | 1/1992 |
| EP | 0498667 | 8/1992 |
| WO | WO 0177231 | 10/2001 |

OTHER PUBLICATIONS

English abstract for JP 2001 181530, Jul. 3, 2001.
U.S. Appl. No. 10/569,112, filed Feb. 21, 2006, Ganschow.

* cited by examiner

*Primary Examiner*—Kriellion A Sanders
(74) *Attorney, Agent, or Firm*—Richard P. Silverman

(57) ABSTRACT

A method for distortion-free pigmentation of partly-crystalline plastics, characterized in that a phthalocyanine pigment is used which has been heated to a temperature of at least 80° C. as a suspension in an acid-free organic medium in the presence of a base.

14 Claims, No Drawings

METHOD FOR DISTORTION-FREE PIGMENTATION OF PARTLY-CRYSTALLINE PLASTICS WITH PHTHALOCYANINE PIGMENTS

The present invention relates to phthalocyanine pigments for coloration of macromolecular organic material, especially for warpage-free pigmentation of partly crystalline plastics, especially polyolefins.

The coloration of partly crystalline plastics with organic pigments frequently gives rise to warpage or distortion phenomena. The pigmentation of large-volume injection moldings, especially those composed of polyethylene, leads to deformation, shrinkage and cracking (internal stresses), rendering the colored articles unusable, depending on the field of application. Bottle crates, for example, are likely to become unstackable by loss of shape.

These disadvantages relate to the majority of organic pigments, whereas inorganic pigments and a minority of organic pigments behave neutrally. It is believed that pigments act as nucleation sites during the solidification of the polymer melt and thus lead to a polymer which is prone to warp/distort.

Various methods have already been proposed to counteract the warpage problem. Warpage-free pigments are obtained according to U.S. Pat. No. 4,107,133 by treatment of copper phthalocyanines with a silane or titanate coupler, according to U.S. Pat. No. 4,233,206 through organic pigments (especially copper phthalocyanines) which contain methylol groups esterified with carboxylic acids, according to EP 0 466 646 through pigments coated with polar polymers, according to EP 0 498 667 for use of polyalkyleneoxy-substituted dyes, according to EP 0 296 107 through ethylcellulose-coated pigments, according to DE 43 13 090 through organic pigments which have been exposed to a low temperature plasma, according to DE 42 14 868 through sulfonic acid and alkali metal sulfonate group modified pigments and according to WO 01/77231 through incipiently chlorinated copper phthalocyanines having a chlorine content of 10-40% by weight and a dispersion harshness $\leq 10$.

However, these methods do not always meet the current requirements in the art and do not lead to the desired result, depending on the pigment used. In addition, most of these methods are inconvenient and they even require the synthesis of pigment derivatives.

It has now been found that phthalocyanines, especially copper phthalocyanines, can be converted by treatment with bases in organic media into warpage-free phthalocyanines of high color strength which are surprisingly useful for warpage-free pigmentation of partly crystalline plastics.

The present invention provides a process for warpage-free pigmentation of partly crystalline plastics, characterized in that it utilizes a phthalocyanine pigment which was heated to not less than 80° C. as a suspension in an acid group free organic medium in the presence of a base.

As used herein, the term "warpage-free" is to be understood as meaning a degree of warpage which is distinctly reduced compared with the untreated pigment.

The process of the present invention is preferably employed in the case of phthalocyanines having Fe, Ni, Co or Cu as central atom or in the case of metal-free phthalocyanines having a halogen content of 0% to 50% by weight. Halogen is to be understood as meaning chlorine and/or bromine, especially chlorine. Particular preference is given to chlorine-containing copper phthalocyanines, especially those having a chlorine content of 1% to 50% by weight and most preferably having a chlorine content of 2% to 10% by weight, corresponding to about 0.5 to 2 chlorine atoms per molecule, for example in the case of C.I. Pigment Blue 15 (chlorine-free), 15:1, 15:2, 15:3, 15:4, 15:6, 16 and also C.I. Pigment Green 7 and 36.

The organic medium employed is an acid group free, especially carboxylic acid and phenol free, polar organic solvent, preferably aliphatic acid amides, such as N,N-dimethylformamide; cyclic carboxamides, such as N-methylpyrrolidone, alcohols having 1 to 20 carbon atoms, more preferably $C_2$-$C_6$-alcohols, cyclohexanol, especially N-, iso- or tert-butanol; glycols, ethers and glycol ethers, such as tetrahydrofuran, ethylene glycol, propylene glycol, ethyldiglycol, methoxypropanol, methoxybutanol, ethylene glycol monoalkyl ethers or dialkyl ethers, wherein alkyl is selected from methyl, ethyl, propyl and butyl; polyethylene glycol monomethyl ethers, especially those having an average molar mass of 350 to 550 g/mol, and polyethylene glycol dimethyl ethers, especially those having an average molar mass of 250 to 500 g/mol; aromatic hydrocarbons, such as toluene, xylenes or ethylbenzene; aromatic halohydrocarbons, such as chlorobenzene, dichlorobenzenes or bromobenzene; nitrobenzene; sulfones and sulfoxides, such as dimethyl sulfoxide or sulfolan; and also mixtures thereof.

The amount of organic medium employed per g of phthalocyanine pigment is generally in the range from 1 to 30 g and preferably in the range from 5 to 15 g. It will be appreciated that large amounts of organic medium can be used as well, but this would be uneconomical. If smaller amounts of organic medium were used, the reaction mixture might be difficult to stir.

The copper phthalocyanine used in the process of the present invention can be a crude pigment, a ground prepigment (activated by dry grinding) or a ground and finished pigment (ready-produced pigment). The copper phthalocyanine used in the process of the present invention is advantageously used as a dried material having a water content of not more than 2% by weight. A higher water content should be avoided, since the warpage values of the pigments produced according to the present invention would increase. The organic medium preferably has a water content of not more than 1% by weight, and preferably the water content is in the range from 0.03% to 0.2% by weight.

Useful bases include for example:

alkali metal hydroxides, alkaline earth metal hydroxides, alkali metal alkoxides and alkaline earth metal alkoxides, the alkoxide having 1 to 20 carbon atoms and preferably 2 to 4 carbon atoms. Particular preference is given to sodium hydroxide, potassium hydroxide, sodium ethoxide and potassium ethoxide.

It will be advantageous to use 5 to 300 mol % of base and preferably 10 to 100 mol %, based on the pigment. The base should likewise be used in a very water-free form (not more than 1% by weight of water).

It is in many cases advantageous for the organic medium to further comprise an aliphatic alcohol having 1 to 20 carbon atoms and preferably having 6 to 16 carbon atoms. Based on the pigment, it will be advantageous to use 0 to 200 mol %, preferably 1 to 100 mol % and especially 10 to 80 mol % of alcohol. The use of larger amounts of alcohol is possible, but uneconomical.

In the event that the organic medium itself already is or contains an alcohol, the additional alcohol can be left out, or the additional alcohol chosen will have a larger number of carbon atoms than the alcohol of the organic medium. If, for example, the organic medium contains butanols, the additional alcohol will be an octanol or a mixture of two or more octanols.

The present invention's treatment of the copper phthalocyanine can be carried out in an open or closed system at not less than 80° C., preferably at 120 to 220° C. and especially at 160 to 200° C., in which case the operation in a closed system will usually be carried out under the autogenous pressure. If desired, a higher pressure can be employed in an autoclave.

The thermal treatment generally takes from 1 to 24 h and preferably from 1 to 8 h.

The treated pigment will advantageously be isolated as follows:

The reaction mixture is cooled, preferably to about 40 to 80° C., and the suspension is stirred into water. Then the suspension is neutralized with an acid, for example HCl, and the pigment separated off by filtration. The pigment is washed, dried and ground. It will be appreciated that the pigment may also be filtered off directly after cooling and then be washed with plenty of water, dried and ground. No further finish is required.

The copper phthalocyanines produced according to the present invention are very useful for coloration of partly crystalline plastics.

Partly crystalline plastics is to be understood as referring to those which solidify to form small crystalline nuclei or aggregates, including those which do so only in the presence of nucleating agents (organic pigments for example). Partly crystalline plastics are generally thermoplastic macromolecular organic materials having a molecular weight ($M_w$) of $10^4$ to $10^8$, preferably $10^5$ to $10^7$, and a crystallinity ($X_c$) of 10 to 99.9%, preferably of 40 to 99% and more preferably of 80 to 99%. Preferred partly crystalline plastics are homopolymers, block or random copolymers and terpolymers of ethylene, propylene, butylene, styrene and/or divinylbenzene, especially polyolefins, such as polyethylene (HDPE, MDPE, LDPE), polypropylene, especially high density polyethylene (HDPE), also polystyrene, PVC, polyesters, such as polyethylene terephthalate, and polyamides, such as nylon 6 and nylon 66.

The partly crystalline plastics may further comprise additives in customary amounts, examples being stabilizers, optical brighteners, fillers and lubricants.

When used for coloration of partly crystalline plastics, the phthalocyanine pigment treated according to the present invention will advantageously be used in an amount of 0.01% to 5% by weight and preferably 0.05% to 1% by weight, based on the plastic. The coloration step can be carried out according to customary methods, as by extrusion for example.

The influence on the warpage propensity of polyolefin by the pigment produced according to the present invention is tested on a ready-produced injection molding in the form of a plaque. After aging, the dimensions of the plaque (length, width) are measured and the degree of warpage is determined according to the following equation:

% warpage=(% warpage vertical−% warpage horizontal)/(% warpage horizontal)×100%

The warpage values are determined at 220° C. and at 280° C. Pigments where warpage is below 10% have proved warpage-free in commercial practice. Pigments where warpage is in the range from 10% to 20% are known as low warpers and need to pass a preliminary test to be used for warpage-free coloration of plastics.

The phthalocyanine pigments produced according to the present invention can of course also be used for pigmenting any desired macromolecular material of natural or synthetic origin, for example for masterbatches, inks, including printing inks, including inkjet inks, coatings, including powder coatings, paints, electrophotographic toners and color filters.

In the examples which follow percentages are by weight, unless otherwise stated.

EXAMPLE 1

A mixture of 20 g of ready-produced copper phthalocyanine pigment (P.B. 15:1, chlorine content about 3%) having a water content ≦0.6%, 180 ml of N-methylpyrrolidone, 0.93 g of sodium ethoxide and 1.07 ml of 1-octanol are heated to 180° C. for 2 hours. After the suspension has been cooled down, the mixture is stirred into water and is subsequently neutralized with hydrochloric acid. The reaction mixture is filtered off with suction, washed with ethanol and then with water and ground.

EXAMPLE 2

Example 1 is repeated except that the reaction mixture is without stirring into water neutralized after cooling and then filtered off with suction.

EXAMPLE 3

A mixture of 20 g of crude copper phthalocyanine pigment (P.B. 15:1, chlorine content about 3%) having a water content ≦0.6%, 300 ml of N-methylpyrrolidone, 1.86 g of sodium ethoxide and 2.14 ml of 1-octanol are heated to 180° C. in a sealed vessel for 8 h. Cooling is followed by a workup as under example 1.

EXAMPLE 4

A mixture of 20 g of crude copper phthalocyanine pigment (P.B. 15:1, Cl content about 3%) having a water content ≦0.6%, 250 ml of ethylene glycol monobutyl ether and 2.33 g of sodium ethoxide are heated to 170° C. for 6 h. Cooling is followed by a workup as under example 1.

EXAMPLE 5

A mixture of 20 g of crude copper phthalocyanine pigment (P.B. 15:1, Cl content about 3% by weight) having a water content ≦0.6%, 360 ml of ethylene glycol monobutyl ether and 2.33 g of sodium ethoxide are heated to 180° C. in a sealed vessel for 8 h. Cooling is followed by a workup as under example 1.

EXAMPLE 6

A mixture of 40 g of ready-produced copper phthalocyanine pigment (PV-Echtgrün GG; P.G. 7, Cl content 49% by weight) having a water content ≦0.6%, 180 ml of N-methylpyrrolidone and 1.26 g of sodium ethoxide are heated to 180° C. for 2 h. Cooling is followed by a workup as under example 1.

The pigments of examples 1 to 6 are used to pigment polyethylen plaques (600 g of ®Novolen and 0.6 g of pigment) and warpage is determined.

Method: Shrinkage testing of organic pigments in injection-molded polyethylene. A rectangular plaque is molded with film gate and the dimensions 60 by 60 mm. Evaluation is by measurement along and across the direction of molding. For each pigment tested 10 moldings were produced and measured out, the respective average value being employed. The control used is 10 moldings from nonpigmented plastic. It is very important in this connection that this material experience exactly the same processing history as the pigmented system.

TABLE

| Example | Warpage to 220° C. [%] | Warpage to 280° C. [%] |
|---|---|---|
| untreated P.B. 15:1 | 82 | 87 |
| 1 | 5 | 6 |
| 2 | 21 | 9 |
| 3 | −7 | −9 |
| 4 | 49 | 47 |
| 5 | 43 | 43 |
| untreated P.G. 7 | 63 | 19 |
| 6 | 31 | −1 |

The polyethylene plaques pigmented according to the present invention have a distinctly lower warpage value than untreated P.B. 15:1. Especially the plaques colored with the pigments as per examples 1 to 3 have very good warpage values compared with the plaques colored with untreated pigment.

The invention claimed is:

1. A process for producing a treated phthalocyanine pigment for warpage-free pigmentation of a partly crystalline plastic comprising the steps of providing a phthalocyanine pigment as a suspension in an acid group free organic medium being a solvent selected from the group consisting of water, aliphatic acid amides, cyclic carboxamides; alcohols having 6 to 20 carbon atoms, glycols, ethers, glycol ethers, aromatic hydrocarbons, aromatic halohydrocarbons, nitrobenzene; sulfoxides, sulfones and mixtures thereof, wherein the acid group free organic medium comprises not more than 1 weight percent water in the presence of a base, heating the suspension at a temperature not less than 80° C. and isolating the treated phthalocyanine pigment.

2. The process according to claim 1, wherein the phthalocyanine pigment is a copper phthalocyanine pigment.

3. The process according to claim 1 wherein the phthalocyanine pigment is a chlorinated copper phthalocyanine pigment.

4. The process according to claim 1, wherein the base is an alkali metal hydroxide, alkaline earth metal hydroxide, alkali metal alkoxide, alkaline earth metal alkoxide, wherein the alkoxide has 1 to 20 carbon atoms, or a mixture thereof.

5. The process according to claim 1, wherein the base is used in an amount of 5 to 300 mol %, based on pigment.

6. The process according to claim 1, wherein the providing step further comprises providing an aliphatic alcohol having 6 to 20 carbon atoms as well as the organic medium.

7. The process according to claim 1, wherein the heating step further comprises heating the suspension to a temperature of 120 to 220° C.

8. The process according to claim 1, wherein the suspension is heated for a period from 1 to 24 hours.

9. A treated phthalocyanine pigment made in accordance with the process of claim 1.

10. A process for producing warpage-free pigmentation of a partly crystalline plastic comprising the step of coloring the partly crystalline plastic with a treated phthalocyanine pigment according to claim 7.

11. A process according to claim 8, wherein the plastic is colored with 0.01% to 5% by weight, based on the weight of the plastic, of the treated phthalocyanine pigment.

12. A partly crystalline plastic comprising a treated phthalocyanine pigment made in accordance with the process of claim 1.

13. The partly crystalline plastic according to claim 10, wherein the plastic is a polyolefin.

14. The partly crystalline plastic according to claim 10, wherein the polyolefin is polyethylene or polypropylene.

* * * * *